United States Patent [19]

Ikoma

[11] 3,959,689
[45] May 25, 1976

[54] TWISTING DISTORTION CORRECTING CIRCUITRY

[75] Inventor: Junichi Ikoma, Tokyo, Japan

[73] Assignee: Hitachi, Ltd., Japan

[22] Filed: June 10, 1974

[21] Appl. No.: 477,972

[30] Foreign Application Priority Data
June 11, 1973 Japan.............................. 48-65688

[52] U.S. Cl................................ 315/370; 315/387
[51] Int. Cl.² ....................................... H01J 29/56
[58] Field of Search..................... 315/370, 371, 387

[56] References Cited
UNITED STATES PATENTS
2,574,946  11/1951  White ................................. 315/371
2,829,303  4/1958  Knechtli............................. 315/379

Primary Examiner—Maynard Wilbur
Assistant Examiner—T. M. Blum
Attorney, Agent, or Firm—Craig & Antonelli

[57] ABSTRACT

A twisting distortion correcting circuit to remove the twisting distortion in a picture on a television receiver in such a way that beam current of the television receiver is detected, and the high frequency components and the d.c. components in the detected beam current are removed so as to obtain a voltage wave form analogous to the mean horizontal deflection current wave form, and then the voltage wave form obtained is fed to the horizontal oscillation circuit whose oscillating frequency is controlled by the output voltage of the AFC circuit, whereby the twisting distortion of the picture is corrected by producing the twisting distortion opposite to that of picture caused by a substantial variation of the beam current.

5 Claims, 4 Drawing Figures

TWISTING DISTORTION CORRECTING CIRCUITRY

The present invention relates to a twisting distortion correcting circuit for removing a twisting distortion in a picture of a television receiver.

In a picture of which the mean beam current changes considerably depending on the brightness signal, the twisting distortion often occurs. That is, the picture is often distorted like a twisting line running in the vertical direction thereof.

An illustration of FIG. 1 is an example of a picture suffering from such a remarkable twisting distortion, in which there are observed three horizontal bands, black for the upper and the lower bands and white for the center one, horizontal lines being shifted to the right when the vertical scanning proceeds from the black band to the white band while shifted to the left when the vertical scanning further proceeds from the white band to the black band. The twisting distortion arises from the fact that a change of the mean horizontal deflection current is caused by the change of the mean beam current. A more detailed explanation of this fact will be made below.

In the case of the picture as shown in FIG. 1, the mean beam current, during one field time, changes as shown in diagram (a) of FIG. 2. At this time, the high anode voltage of the cathode ray tube changes as shown in diagram (b) due to the capacitance between the anode and the conductive coating and the source impedance seen from the anode in the high voltage circuit. The change of the high voltage corresponds to the change of the load of the horizontal output circuit so that the horizontal deflection current varies as shown in diagram (c) of FIG. 2, and the mean horizontal deflection current varies as shown in diagram (d). In the horizontal output circuit, operation of the output transistor causes current to flow through the horizontal deflection coil, and its current also causes energy storage in the horizontal deflection coil. During fly-back time, the stored energy is dividedly discharged through the high voltage circuit and the resonant capacitor. When the anode voltage drops, the energy flowing through the high voltage circuit increases, while the energy flowing through the resonant capacitor decreases. As a result, the period for which the damping diode conducts is shortened while the conduction period of the horizontal output transistor is enlongated, resulting in an increased energy stored in the horizontal deflection coils. At the initial stage when the high voltage at the anode drops, an increment of the energy flowing through the high voltage circuit is larger than that of the energy stored into the horizontal deflection coil, and hence, the mean horizontal deflection current increases, as shown in diagram (d) of FIG. 2. However, as the conduction period of the horizontal output transistor elongates, the energy to be stored in the horizontal deflection coil increases, and, after the said initial stage, the increment of the energy to be stored in the horizontal deflection coil is larger than that of the energy shunted to the high voltage circuit, so the current flowing through the damping diode increases while the mean horizontal deflection current decreases. Therefore, the mean horizontal deflection current returns to zero after a period even if the anode voltage remains increased. Accordingly, the picture is shifted to the right in accordance with the magnitude of the mean horizontal deflection current during the period of the mean horizontal deflection current being positive. The result is the twist to the right of the vertical line as shown in FIG. 1. On the contrary, in case the anode voltage is reduced, as in the black band of the lower side, the mean horizontal deflection current goes negative and, after a period, returns to zero, in the operation opposite to that described above. As a result, the picture is twisted to the left. In the picture shown in FIG. 1, when the mean horizontal deflection current increased and then returned to zero, it happens that the picture changes from white to black, resulting in that the mean horizontal deflection current decreases and the vertical line goes to the left.

As is well known, the oscillating frequency of the horizontal oscillation circuit is kept constant through the control by the output voltage of AFC circuit.

As far as the horizontal synchronization is good, the brightness signal and the horizontal deflection current are shifted each other in the phase, if the output voltage of the AFC circuit or the input voltage of the horizonal oscillation circuit is changed. Accordingly, laterally shifting of the picture may be done by varying the input voltage of the horizontal oscillation circuit. In other words, the picture distortion in the horizontal direction is controllable through the control of the input voltage of the horizontal oscillation circuit.

The present invention is constructed on the basis of such idea mentioned above, and its object is to provide a twisting distortion correcting circuitry being capable of eliminating the twisting distortion appearing on the picture when the mean beam current changes considerably.

A twisting distortion correcting circuitry according to the present invention eliminates such twisting distortion in such a way that a voltage whose waveform is akin to that of the mean horizontal deflection current, is produced by detecting the beam current and causing the detected beam current to pass through an integration circuit and a differential circuit, and the voltage produced is supplied to the horizontal oscillation circuit, whereby when a considerable change of the mean beam current occurs, produced is a twisting distortion opposite to that due to the mean beam current change.

The above and other objects, features and advantages of the present invention will be apparent from the detailed description given in connection with the accompanying drawings, in which.

Figure 1:
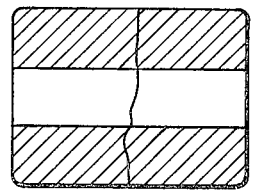
FIG. 1 is an example of the picture having a twisting distortion under consideration therein.
Figure 2:
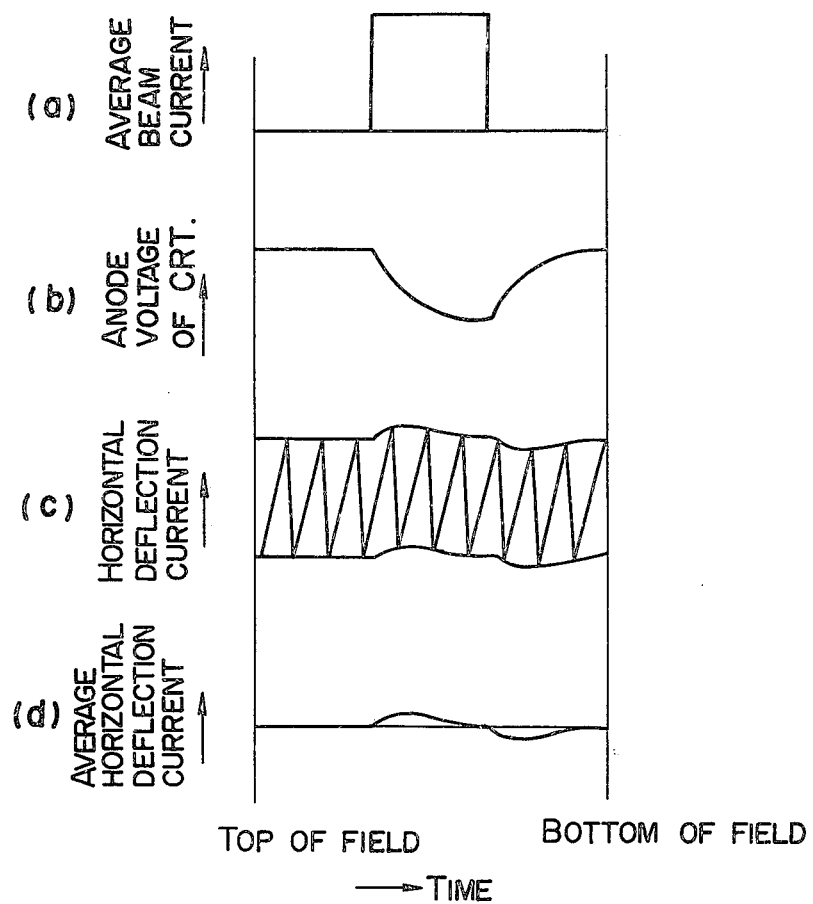
FIG. 2 shows the waveforms of the mean beam current, the anode terminal voltage of the cathode ray tube, the horizontal deflection current, and the mean horizontal deflection current, respectively, during one field time for scanning the picture shown in FIG. 1.
Figure 3:
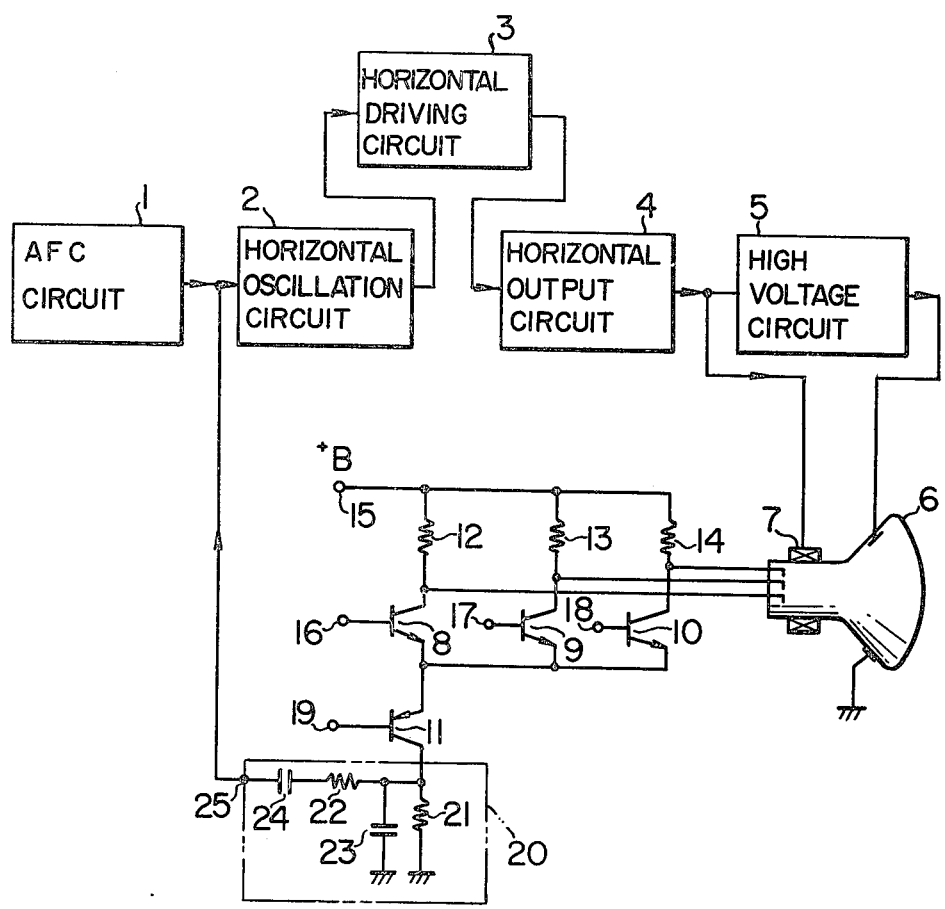
FIG. 3 is a circuit diagram of an embodiment of the twisting distortion correcting circuitry according to the present invention.

Referring to FIG. 3, there is shown a twisting distortion correcting circuit according to the present invention which is a first embodiment. The denotations of the reference numerals thereof will first be referred below for the sake of clarity. In the figure, 1 designates an AFC circuit, 2 a horizontal oscillation circuit, 3 a horizontal driving circuit, 4 a horizontal output circuit, 5 a high voltage circuit, 6 a three-electron-gun cathode ray tube, 7 a horizontal deflection coil thereof, 8, 9 and 10 matrix transistors for matrixing the brightness signal and the color difference signals R-Y, G-Y, and B-Y, respectively, 11 a transistor for amplifying the brightness signal, 12, 13 and 14 load resistors of the matrix transistors 8, 9 and 10, 15 a terminal for a d.c. power supply, 16, 17 and 18 terminals for the color difference signal R-Y, G-Y, and B-Y, respectively, 19 a terminal for the brightness signal, 20 a circuitry for correcting a twisting distortion, 21 and 22 resistors, 23 and 24 capacitors, and 25 a terminal for the circuitry 20. The circuit in FIG. 3 except the dotted lined block, or the circuitry 20, is a part of the known color television receiver. In the actual circuit, the collector of the transistor 11 is directly grounded. A brief description about the prior art circuit will be made below, for the better understanding of the present invention. The oscillation frequency of the horizontal oscillation circuit 2 is kept constant with the output voltage of the AFC circuit 1. It is assumed that, when the output voltage of the AFC circuit 1 increases, the oscillation frequency of the circuit 2 is reduced. The output voltage of the circuit 2 is supplied through the exciting circuit 3 to the horizontal output circuit 4. The output of the horizontal output circuit 4 is applied to the horizontal deflection coil 4 while at the same time to the anode of the cathode ray tube 6 through the high voltage circuit 5. The color difference signals R-Y, G-Y, and B-Y supplied to the terminals thereof 15, 16 and 17, and the brightness signal which is supplied to the terminal 18 and then amplified by the transistor 11, are added by the transistors 8, 9 and 10 to form the original primary colors, red, green and blue. These original primary colors decoded, then, are supplied to the cathode of the cathode ray tube 6.

The dotted lined block 20 is the circuit for correcting the twisting distortion of the picture, constituting the present invention, and comprises resistors 21 and 22, and capacitors 23 and 24. The resistor 21 and the capacitor 23 are connected in parallel, and are connected at one ends to the collector of the transistor 11 while connected to ground at the other end. The resistor 22 and the capacitor 24 are connected in series at the one ends thereof, and the resistor 22 is coupled at the other end with the collector of the transistor 11 while the capacitor is coupled at the other end with the terminal 25. The parallel circuit comprising the resistor 21 and the capacitor 23 serves to integrate the collector current of the transistor 11 whose changing is similar to that of the beam current. Accordingly, the voltage waveform appears at the collector of the transistor 11, which is analogous to that of the collector current deprived of the high frequency components. The collector voltage whose high frequency components are removed, is supplied through the series-connected circuit consisting of the resistor 22 and the capacitor 24 to the horizontal oscillation circuit. The series-connected circuit, together with the input impedance of the horizontal oscillation circuit, constitutes a differential circuit serving to eliminate the low frequency components substantially equal to the direct current from the collector voltage of the transistor 11. The integrating circuit and the differential circuit eliminating the high frequency components and the direct current component, respectively, is provided for obtaining the voltage waveform at the terminal 25 being analogous to the mean horizontal deflection current waveform. It is possible to obtain such voltage waveform at the terminal 25 if the time constants in the integrating circuit and the differentiating circuit are appropriately selected. Since the voltge of such waveform is supplied to the horizontal oscillation circuit 2, in case increase of the mean horizontal deflection current causes the picture to shift to the right, the oscillation frequency of the horizontal oscillation circuit 2 is reduced and thus the horizontal deflection current is retarded in phase in relation to the brightness signal, thereby causing the picture to shift to the left. Accordingly, the twisting distortion of the picture due to the variation of the load of the horizontal output circuit 4 may be cancelled with the twisting distortion caused by varying the input voltage of the horizontal oscillation circuit 2.

It should be noted that, if the horizontal oscillation circuit is such a circuit that increase of its input voltage brings about its frequency increase, the same effect of the twisting distortion correction may be attained by supplying to the horizontal oscillation circuit 2 the reversed voltage of the voltage appearing at the terminal 25.

Figure 4:
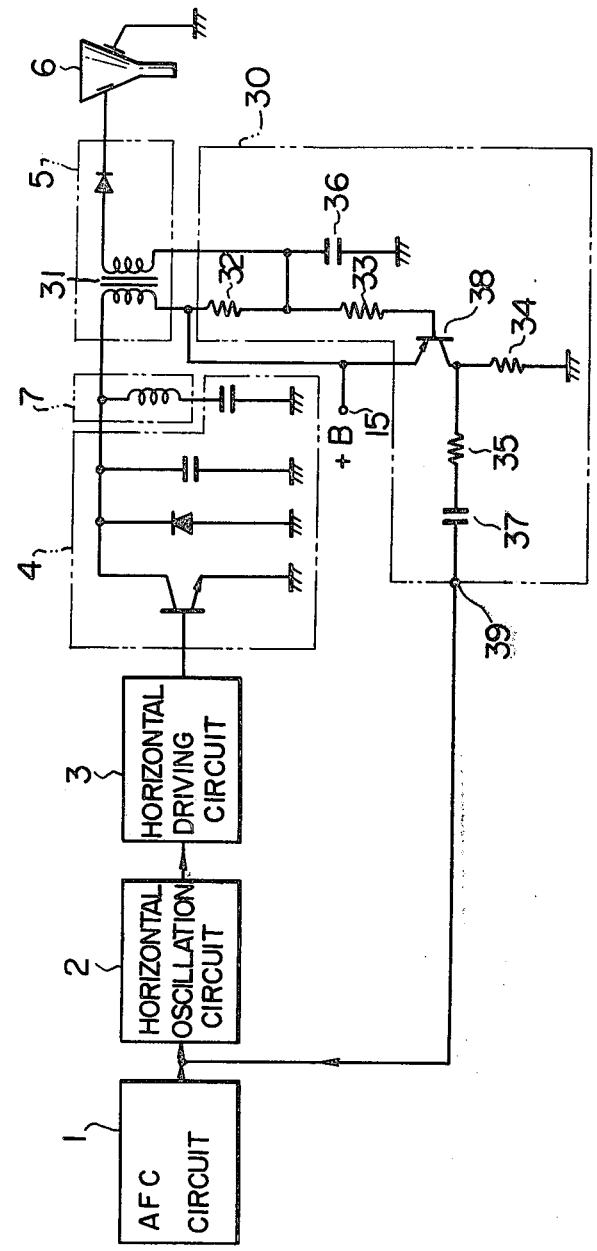
FIG. 4 is a circuit diagram of another embodiment of the twisting distortion correcting circuitry according to the present invention.

A second embodiment of the present invention is illustrated in FIG. 4, featuring that detection of the beam current is made at the secondary coil of the fly-back transformer.

In FIG. 4, the circuitry in the dotted lined block 30 constitutes the twisting distortion correcting circuitry of the present invention, while the other circuitry constitutes the known horizontal deflection and the high voltage circuits.

In the figure, like reference numerals therein designates like parts in FIG. 3, and 31 designates a fly-back transformer, 32, 33, 34 and 35 resistors, 36 and 37 capacitors, 38 a transistor, and 39 an output terminal of the twisting distortion correcting circuit. The fly-back transformer 31 is connected at the lower voltage side of the secondary coil thereof to the terminal 15 through the resistor 32 and to ground through the capacitor 36, and furthermore to the base electrode of the transistor 38 through the resistor 33. The transistor 38 is connected at the emitter electrode to the terminal 15 and at the collector electrode through the resistor 34 to ground while to the terminal 39 through the series circuit consisting of the resistor 35 and capacitor 37.

The capacitor 36 serves to smooth the beam current and also constitutes an integrating circuit, together with the resistors 32, 33 and 34. The integrating circuit is used for removing a high frequency component from the beam current and corresponds to that of FIG. 3 consisting of the resistor 21 and the capacitor 23. The resistors 32 and 33 divide between them the current flowing through the secondary winding of the fly-back transformer 31. The collector electrode of the transistor 38 receives the voltage waveform having an opposite phase with respect to the voltage waveform appearing at the lower voltage side of the secondary winding of the fly-back transformer 31. The transistor 38 serves to reverse the phase of the voltage resulted from the detection of the beam current. As in the case of the series-connected circuit consisting of the resistor 22 and the capacitor 24 in FIG. 3, the series-connected circuit consisting of the resistor 35 and the capacitor 37 removes the d.c. component from the collector voltage of the transistor 38 with the result that the voltage waveform analogous to the mean deflection current appears the output terminal 39. Therefore, the application of this voltage to the horizontal oscillation circuit 2 causes the change of the beam current, and so to produce the twisting distortion of the picture reverse to that caused by the change of the load of the horizontal output circuit 4. As a result, the twisting distortion due to the change of the beam current is corrected.

While there have been described what are at present considered preferred embodiments of the invention, it will be obvious to those skilled in the art that various changes and modifications may be made within the scope of the invention.

What we claim is:

1. In a television receiver having a horizontal oscillation circuit whose frequency is controlled by an input signal applied thereto and whose average horizontal deflection current increases and decreases in response to reproduction of a bright area and a dark area after the bright area, respectively, the improvement including a twisting distortion correcting circuit comprising:
detecting means to which a signal to be detected with a waveform analogous to that of the beam current of the cathode ray tube is supplied, for detecting a change of said signal to be detected, and correcting signal generator means to which the output signal of said detecting means is supplied, for operatingly removing high frequency components and d.c. components from said output signal of said detecting means, so as to form a control signal with a waveform analogous to that of the average horizontal deflection current, in which the output signal of said correcting signal generator means is applied to said horizontal oscillation circuit, with a phase capable of producing decrease and increase in the oscillation frequency in response to the increase and decrease in the beam current.

2. In a television receiver having
a cathode ray tube,
a horizontal oscillation circuit whose oscillation frequency is controlled by an input signal applied thereto,
a horizontal output circuit, coupled to said horizontal oscillation circuit, for effecting horizontal deflection on said cathode ray tube, and
a high voltage circuit, coupled to said horizontal output circuit and said cathode ray tube, for supplying a high voltage to said cathode ray tube,
the improvement comprising
a twisting distortion correcting circuit for said television receiver whose average horizontal deflection current increases and decreases in response to bright and dark areas, respectively, of a high contrasted image with a high bright area among darkness to be reproduced on the cathode ray tube, said twisting distortion correcting circuit comprising:

detecting means supplied with a signal with a waveform analogous to that of a beam current of the cathode ray tube, for generating a detected output signal upon detecting the increase and decrease of said signal corresponding to the bright area and the dark area, respectively, control means, responsive to the detected output signal of said detecting means, for generating a control signal which has such a polarity and a magnitude to enable the oscillation frequency of said horizontal oscillation circuit to be decreased and increased, and means for supplying said control signal to said horizontal oscillation circuit.

3. The improvement according to claim 2, wherein said control means includes means for removing high frequency and d.c. components from said detected output signal.

4. In a television receiver including a cathode ray tube, a horizontal oscillation circuit the oscillation frequency of which is controlled by an input signal applied thereto, a horizontal output circuit coupled to the output of said horizontal oscillation circuit for controlling the horizontal deflection of the electron beam within said cathode ray tube, and a high voltage circuit coupled between said horizontal output circuit and said cathode ray tube for supplying a high voltage to said cathode ray tube, the improvement comprising a twisting distortion correction circuit for correcting the twisting distortion of the picture in said cathode ray tube resulting from a variation in the beam current of the cathode ray tube, said twisting distortion correction circuit comprising:
first means, responsive to a signal representative of the beam current of said cathode ray tube, for removing high frequency components from said signal,
second means, coupled to said first means, for removing low frequency components from the signal at the output of said second means, and
third means, coupled between said second means and the input of said horizontal oscillation circuit, for supplying a control signal to said horizontal oscillation circuit representative of the mean horizontal deflection current to compensate for the twisting distortion of the picture resulting from a variation of the load of the horizontal output circuit and a corresponding change in the beam current.

5. The improvement according to claim 4, wherein said first means is coupled to receive a signal representative of the brightness of the picture signal applied to said cathode ray tube.

* * * * *